3,281,496
REACTIVATION AND STABILIZATION OF PHE-
NOLIC ADHESIVES USING BENZOQUINONE,
PEROXIDES, ANHYDRIDES AND ACIDS
Rip G. Rice, San Diego, Calif., Wallace S. Hay, Fort
Worth, Tex., and Dee M. Perkins, San Diego, Calif.,
assignors, by mesne assignments, to the United States
of America as represented by the Secretary of the Air
Force
No Drawing. Filed Jan. 30, 1962, Ser. No. 169,984
12 Claims. (Cl. 260—845)

The present invention relates to the reactivation and stabilization of adhesives which are prepared from phenol-formaldehyde resins utilizing hexamethylenetetramine as the hardening agent.

The term "stabiliaztion" as used here means a minimizing of the deleterious effects of the presence of water in the liquid adhesive on the subsequent bonding strength thereof.

When liquid adhesives which contain hexamethylenetetramine are allowed to stand for extended periods of time they slowly lose their adhesive properties. These adhesive properties are lost much more rapidly when the adhesives are allowed to absorb moisture from the air. As a result, the storage of these adhesives has become a problem, and once an adhesive container is opened, the adhesive soon deteriorates.

An object of the present invention is to provide a method of stabilizing these adhesives which minimizes the deterioration of their bonding properties.

The deterioration of the bonding properties of liquid adhesives is also a cause of waste in industry. Quite often a container or batch of adhesive will become useless before an appreciable portion of the batch can be used. The remainder is merely waste to be disposed of.

Another object of the present invention is to eliminate this waste by providing a method of reactivating liquid adhesives that have lost their bonding properties.

Liquid form, however, is not the only form in which phenol-formaldehyde, resol ("A" stage), adhesives exist. The adhesives are manufactured in film form as well as liquid form. The film adhesives are frequently used to prepared liquid adhesives, but because of the inconsistent behavior of film adhesives from batch to batch, the liquid adhesives derived therefrom are inconsistent in their behavior also.

Another object of the present invention is to provide a method of preparing and stabilizing the liquid adhesives that substantially standardizes their behavior.

Still other objects and features of the present invention will be readily apparent to those skilled in the art from the following specification wherein a description and explanation of the invention is given.

In order to facilitate this explanation it will be helpful to first examine the causes that produce the deterioration of the adhesives.

Phenol-formaldehyde (resol) resins which contain hexamethylenetetramine as the hardening agent are cured by heating the resin at such a temperature as to affect decomposition of the hexamethylenetetramine. This decomposition takes place by the following route:

$$(CH_2)_6N_4 + 6H_2O \rightarrow 6HCHO + 4NH_3$$

The formaldehyde liberated as a result of the decomposition reacts with the (resol) resin to cross link the polymer chains and effectively cure the resin. A small amount of water is all that is required to initiate the decomposition since subsequent condensation of the formaldehyde with the (resol) resin generates more water in molar amounts. This small initial amount of water is contained in the resin as supplied. The ammonia liberated is a base which serves to catalyze the further condensation of formaldehyde with the (resol) resin, thus aiding in the ultimate decomposition of the hexamethylenetetramine.

The temperature required to initiate the rapid decomposition of hexamethylenetetramine is dependent upon the amount of ammonia present in the liquid adhesive. Relatively high temperatures are required when small amounts of ammonia are present. However, relatively low temperatures will initiate the rapid decomposition of the amine when relatively large amounts of ammonia are present in the liquid adhesive.

Since, at room temperature, hexamethylenetetramine and water are in equilibrium with formaldehyde and ammonia, the amount of ammonia present will depend to a great extent upon the amount of water present in the system. The larger the amount of water present, the larger will be the amount of ammonia present. Thus, the temperature required to initiate the rapid decomposition of hexamethylenetetramine is dependent, indirectly, upon the amount of water contained in the system.

A liquid adhesive prepared from such a phenol-formaldehyde (resol) resin necessarily contains a small amount of water which is provided in the raw materials. If the liquid adhesive is exposed to atmospheric conditions after manufacture, a small amount of water is absorbed which results in the generation of a small amount of ammonia over and above that already present. This increase in ammonia content thus lowers the temperature required to initiate the cure of the liquid adhesive.

In the use of the adhesive, such as in the adhesive bonding of aircraft parts, the temperature required to initiate the cure of the liquid adhesive can be quite critical. For example, in one method of bonding panels which contain a honeycomb core, two adhesive systems are employed; one an epoxy-phenol-formaldehyde (resol) and the other a nitrile rubber phenol-formaldehyde (resol). The curing cycle used is such that the temperature of the part being bonded is held at a temperature $T_1$ for a period of time to allow the epoxy-phenol-formaldehyde (resol) adhesive to cure. Then the temperature is raised to a substantially higher temperature $T_2$, the optimum temperature for curing the nitrile rubber phenol-formaldehyde (resol) adhesive to provide maximum adhesion. It is important that the nitrile rubber phenol-formaldehyde (resol) adhesive does not cure during the dwell time at the lower temperature $T_1$ since poor adhesion of the system results therefrom. If the temperature required to initiate the cure of the nitrile rubber phenol-formaldehyde (resol) liquid adhesive is lowered below $T_1$, as a result of a small increase in water content with subsequent generation of a small amount of ammonia over and above that originally present, then a considerable amount of curing of the liquid adhesive takes place during the dwell time at $T_1$. When the temperature is raised finally to $T_2$ not enough uncured adhesive (resol) remains to produce the proper adhesion of metal to adhesive, and the bonded part is structurally unsatisfactory.

To prevent this type of occurrence, and to achieve the objects previously delineated, research was initiated to find a method of stabilizing phenol-formaldehyde (resol) liquid adhesives which contained hexamethylenetetramine (resol).

As a result of this work it was found that the addition of small quantities of certain quinones, peroxides, acids and anhydrides to the (resol) liquid adhesives results in a very considerable extension of their useful lives. It was also found that these substances could be used to effectively reactivate, for extended periods, those liquid phenol-formaldehyde (resol) adhesives which had lost their desired adhesive properties. Still further, phenol-formaldehyde film adhesives when made into liquid adhesives will perform consistently and satisfactorily when any one of these substances has been added.

The substances that can be used to achieve these ends are as follows:

(1) Benzoquinone.
(2) Peroxides of the type ROOR, where R is an acyl, alkyl, aralkyl, aroyl, hydrogen or an inorganic residue.
(3) Acids of the type RCOOH, where R is alkyl, aryl or hydrogen.
(4) Anhydrides of the type RCOOOCR, where R is alkyl or aryl.

The symbol "R" as used here is an "inclusive" symbol. The meaning of this can best be explained by using an example. Thus, an aroyl type peroxide can be represented by ROOR where R is the aroyl. An aralkyl type peroxide can also be represented by ROOR but it is understood that R must "include" other elements in order for ROOR to form a peroxide. The aralkyl and aroyl peroxides could be more precisely written as

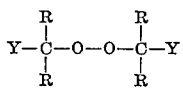

and

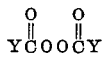

respectively where Y is aryl and R is alkyl. The symbol R has thus been replaced by a group of more exact symbols. This more exact representation, however, does not disclose more than does the representation ROOR, for to one skilled in the art it is obvious what is meant by a peroxide of the type ROOR where R is an aralkyl. It is common practice to use symbols such as these in representing chemical compositions and reactions.

It is the reaction of the above described materials with the water and/or ammonia present in the adhesives which produces the desired beneficial effects.

For example:
Acids react with ammonia to form ammonium salts:

Anhydrides react with water to generate acids, which then can react with ammonia:

Anhydrides also can react directly with ammonia to form an acid and an amide:

Peroxides react with water to generate acids:

Peroxides also can react with ammonia to produce acids:

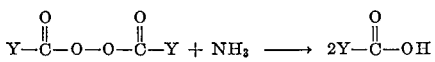

All of these reactions result in the chemical removal of water and/or ammonia from the liquid adhesives. This effectively raises the temperature required to initiate curing and results in a more stable adhesive.

The adhesive referred to herein consists essentially of a nitrile rubber compounded with a phenol-formaldehyde, stage "A" or resol, resin which has been blended with a portion of hexamethylenetetramine. The nitril rubber consists of any condensation polymer made from a conjugated diene as butadiene and a nitrile-containing olefin such as acrylonitrile. Although a copolymer of butadiene and a acrylonitrile is specifically preferred any nitrile rubber can be compounded with phenol-formaldehyde resins to form the starting material for this invention provided that hexamethylenetetramine is used as the curing agent. In making the adhesive, the nitrile rubber is milled on a rubber mill for some time during which time the phenol-formaldehyde resin containing hexamethylenetetramine is added and the rubbery mass is worked until semifluid. This semi-fluid mass is then calendered and cooled to form a dry film.

To properly prepare a liquid adhesive from a dry film adhesive, the following method should be followed:

A dry film nitrile rubber phenol-formaldehyde resol adhesive containing hexamethylenetetramine is dissolved in a solution of methyl ethyl ketone:toluene (9:1 by volume), the total solids content preferably being adjusted to 10±1%. To this is added one of the stabilizing additives previously set forth, the amount of additive employed being in the range from 3% to 15% by weight of the total solids content of the liquid adhesive.

Technical grade solvents can be used in this method but it is preferred that they be dried by distillation or other means so that there is a very minimum of water in the solvent when the film adhesive is dissolved therein. As previously discussed, however, liquid adhesives prepared from film adhesives suffer deterioration just as do those which are originally prepared to liquid form unless the stabilizing agents are used.

In order to show the effect of water and the effect of the additives on the bonding properties of adhesives (resol) containing hexamethylenetetramine, some tables have been prepared and are shown below. In these tables the column labeled "Percent Cohesive Failure" refers to that percent of the bond area which tests satisfactorily under "peel" test.

Table 1 shows the effect of water on the bonding or peel properties of sample adhesives. The results listed were obtained from four nitrile rubber phenol-formaldehyde (sesol) liquid adhesives of the same lot number, the liquid adhesives having been prepared from dry film adhesives (resol).

Adhesive 1 was prepared using methyl ethyl ketone and toluene (9:1 solution by volume), each of which had been dried by distillation and stored over Drierite. Peel results were satisfactory (90–100% cohesive failures) for a period of about 34 days. Adhesive 2 was prepared from the same solvent solution to which was added 1% by weight of water. Peel results were unsatisfactory in less than 3 days. Adhesive 3 was prepared from technical grade methyl ethyl ketone and toluene (the 9:1 solvent mixture was shown to contain about 0.7% water by Karl Fisher analysis) and gave satisfactory peel results for about 15 days. This sample of adhesive 3 necessarily was opened at the time intervals designated in order to prepare the peel specimens, and thus was exposed to atmospheric conditions of relative humidity many times. Adhesive 4 was a duplicate sample of adhesive 3 which was tested after 24 hours, then after 30 days, without being opened during the intervening period. The peel results from adhesive 4 were satisfactory after 30 days, in contrast to adhesive 3 which gave unsatisfactory peel results after 15 days.

TABLE 1.—EFFECT OF WATER ON PEEL PROPERTIES OF LIQUID ADHESIVES

| Additive | Age (days) | Percent Cohesive Failure | Peel Strength (in.—lbs.) High—Low |
|---|---|---|---|
| 1. Dried MEK-Toluene | <1 | 100 | 62—51 |
|  | 5 | 100 | 58—58 |
|  | 11 | 100 | 62—58 |
|  | 17 | 98 | 60—59 |
|  | 24 | 98 | 58—56 |
|  | 34 | 95 | 66—44 |
|  | 38 | 0 | 0—0 |
|  | 41 | 0 | 0—0 |
|  | 45 | 0 | 3—0 |
| 2. Dried MEK-Toluene +1% H₂O | <1 | 100 | 64—55 |
|  | 3 | 70 | 60—40 |
|  | 5 | 2 | 10—0 |
|  | 7 | 0 | 0—0 |
| 3. Tech. MEK-Toluene | 3 | 100 | 68—64 |
|  | 7 | 100 | 60—60 |
|  | 9 | 100 | 62—60 |
|  | 11 | 100 | 60—54 |
|  | 14 | 95 | 66—60 |
|  | 15 | 90 | 63—56 |
|  | 17 | 80 | 64—58 |
|  | 21 | 75 | 64—54 |
|  | 23 | 60 | 72—50 |
|  | 28 | 0 | 0—0 |
| 4. Tech. MEK-Toluene | <1 | 98 | 56—56 |
|  | 30 | 90 | 52—50 |

Table 2 shows the relative effect of certain additives in reactivating a nitrile rubber-phenol-formaldehyde (resol) liquid adhesive containing hexamethylenetetramine (resol), each of the additives constituting 5% by weight of total solids. The adhesive used had already deteriorated so that it gave unsatisfactory peel results prior to use of the additive listed. Tables 3 through 6 similarly show the effect of additional additives on the same (resol) liquid adhesive covered in table 2, with the additives of table 2 being again appropriately set forth in certain of the tables for a complete presentation.

Table 7 indicates the effect of specified additives upon the stabilization of the same (resol) adhesive reflected in tables 2 through 6.

TABLE 2.—REACTIVATION OF LIQUID ADHESIVE, EFFECT OF BENZOYL PEROXIDE, BENZOIC ACID AND BENZOIC ANHYDRIDE (5% BY WEIGHT OF TOTAL SOLIDS) ON PEEL PROPERTIES OF LIQUID ADHESIVE

| Additive | Age (days) | Percent Cohesive Failure | Peel Strength (in.—lbs.) High—Low |
|---|---|---|---|
| None | 0 | 0 | |
| Benzoyl Peroxide | <1 | 100 | 61—57 |
|  | 5 | 98 | 68—64 |
|  | 13 | 100 | 57—43 |
|  | 28 | 90 | 58—56 |
|  | 32 | 80 | 52—34 |
|  | 35 | 0 | 0—0 |
| Add 5% Additional Benzoyl Peroxide. | 5 | 98 | 60—58 |
|  | 12 | 95 | 61—58 |
|  | 23 | 95 | 54—54 |
|  | 30 | 98 | 54—51 |
|  | 40 | 100 | 54—52 |
| Benzoic Acid | <1 | 100 | 63—61 |
|  | <3 | 100 | 52—52 |
|  | 10 | 95 | 62—60 |
|  | 17 | 90 | 56—53 |
|  | 22 | 90 | 57—49 |
|  | 25 | 50 | 51—39 |
| Benzoic Anhydride | 1 | 90 | 60—54 |
|  | 5 | 95 | 55—53 |
|  | 12 | 98 | 56—56 |
|  | 18 | 98 | 53—51 |
|  | 32 | 98 | 54—54 |
|  | 43 | 99 | 55—53 |

TABLE 3.—REACTIVATION OF LIQUID ADHESIVE WITH PEROXIDES (5% BY WEIGHT OF TOTAL SOLIDS)

| Additive | Age (days) | Percent Cohesive Failure | Peel Strength (in.—lbs.) High—Low |
|---|---|---|---|
| None | 0 | 0 | |
| Benzoyl Peroxide | <1 | 100 | 61—57 |
|  | 5 | 98 | 68—64 |
|  | 13 | 100 | 57—43 |
|  | 28 | 90 | 58—56 |
|  | 32 | 80 | 52—34 |
|  | 35 | 0 | 0—0 |
| Add 5% Additional benzoyl peroxide. | 5 | 98 | 60—58 |
|  | 12 | 95 | 61—58 |
|  | 23 | 95 | 54—54 |
|  | 30 | 98 | 54—51 |
|  | 40 | 100 | 54—52 |
| Cumene Hydroperoxide | <1 | 95 | 58—57 |
|  | 3 | 98 | 53—53 |
|  | 10 | 90 | 60—53 |
|  | 17 | 95 | 57—56 |
|  | 25 | 95 | 54—51 |
|  | 36 | 40 | 46—37 |
|  | 43 | 95 | 54—50 |
|  | 50 | 75 | 55—45 |
|  | 57 | 90 | 53—50 |
| Tertiary Butyl Hydroperoxide | <1 | 40 | 49—34 |
|  | 7 | 95 | 57—57 |
|  | 17 | 95 | 56—55 |
|  | 25 | 90 | 55—51 |
|  | 32 | 95 | 54—53 |
|  | 39 | 95 | 56—54 |
|  | 46 | 98 | 56—55 |
|  | 53 | 98 | 52—50 |
|  | 57 | 90 | 54—50 |
| Tertiary Butyl Perbenzoate | <1 | 100 | 60—57 |
|  | 3 | 70 | 51—30 |
|  | 7 | 5 | 60—59 |
| Add 5% Additional Tertiary Butyl Perbenzoate. | 1 | 100 | 63—60 |
|  | 6 | 100 | 58—57 |
|  | 14 | 99 | 56—55 |
|  | 21 | 90 | 58—53 |
|  | 24 | 100 | 56—56 |
|  | 35 | 98 | 56—53 |
|  | 49 | 95 | 54—51 |
| MEK peroxide | 3 | 95 | 54—50 |
|  | 10 | 98 | 56—53 |
|  | 17 | 100 | 58—56 |
|  | 24 | 98 | 54—54 |
|  | 31 | 98 | 52—52 |
|  | 34 | 98 | 62—61 |

TABLE 4.—REACTIVATION OF LIQUID ADHESIVE WITH ACIDS (PERCENT BY WEIGHT OF TOTAL SOLIDS)

| Additive | Age (days) | Percent Cohesive Failure | Peel Strength (in.—lbs.) High—Low |
|---|---|---|---|
| None | 0 | 0 | |
| Benzoic Acid (1%) | <1 | 100 | |
|  | 2 | 0 | |
|  | 6 | 0 | |
| Benzoic Acid (3%) | <1 | 95 | 60—52 |
|  | 5 | 10 | 47—20 |
| Add 3% Additional Benzoic Acid | 6 | 99 | 56—56 |
|  | 9 | 98 | 57—56 |
|  | 17 | 90 | 56—52 |
|  | 24 | 99 | 55—54 |
|  | 31 | 80 | 56—45 |
|  | 35 | 80 | 57—48 |
| Benzoic Acid (5%) | <1 | 100 | 63—61 |
|  | 3 | 100 | 52—52 |
|  | 10 | 95 | 62—60 |
|  | 17 | 90 | 56—53 |
|  | 22 | 90 | 57—49 |
|  | 25 | 50 | 51—39 |
| Monochloroacetic Acid (5%) | 7 | 98 | 57—54 |
|  | 17 | 90 | 59—56 |
|  | 25 | 85 | 56—52 |
|  | 29 | 95 | 62—59 |
|  | 39 | 90 | 60—57 |
| Terephthalic Acid (5%) | <1 | 95 | 56—56 |
|  | 3 | 95 | 57—50 |
|  | 10 | 95 | 59—57 |
|  | 17 | 98 | 56—56 |
|  | 25 | 98 | 54—50 |
|  | 32 | 95 | 56—54 |
|  | 43 | 90 | 58—52 |
|  | 57 | 98 | 52—50 |

TABLE 5.—REACTIVATION OF LIQUID ADHESIVE WITH ANHYDRIDES (5% BY WEIGHT OF TOTAL SOLIDS)

| Additive | Age (days) | Percent Cohesive Failure | Peel Strength (in.–lbs.) High—Low |
|---|---|---|---|
| None | 0 | 0 | |
| Benzoic Anhydride | 1 | 90 | 60—54 |
| | 5 | 95 | 55—53 |
| | 12 | 98 | 56—56 |
| | 18 | 98 | 53—51 |
| | 32 | 98 | 54—54 |
| | 43 | 99 | 55—53 |
| Acetic Anhydride | <3 | 98 | 53—47 |
| | 10 | 90 | 63—60 |
| | 14 | 97 | 55—53 |

TABLE 6.—REACTIVATION OF LIQUID ADHESIVE WITH BENZOQUINONE (5% BY WEIGHT OF TOTAL SOLIDS)

| Additive | Age (days) | Percent Cohesive Failure | Peel Strength (in.–lbs.) High—Low |
|---|---|---|---|
| None | 0 | 0 | |
| Benzoquinone | 0.5 | 98 | 62—56 |
| | 5 | 99 | 65—63 |
| | 12 | 98 | 59—57 |
| | 22 | 98 | 58—57 |
| | 33 | 98 | 56—54 |
| | 43 | 96 | 60—58 |
| | 54 | 95 | 56—53 |
| | 61 | 98 | 52—51 |

TABLE 7.—STABILIZATION OF LIQUID ADHESIVE, EFFECT OF ADDITIVES (% BY WEIGHT OF TOTAL SOLIDS)

| Additive | Age (days) | Percent Cohesive Failure | Peel Strength (in.–lbs.) High—Low |
|---|---|---|---|
| Adhesive made with Dried MEK Toluene. | <1 | 100 | 62—51 |
| | 5 | 100 | 58—58 |
| | 11 | 100 | 62—58 |
| No additive | 17 | 98 | 60—59 |
| | 24 | 98 | 58—56 |
| | 34 | 95 | 66—44 |
| | 38 | 0 | 0—0 |
| | 41 | 0 | 3—0 |
| | 45 | 0 | 0—0 |
| Adhesive made with Tech. MEK, Toluene+1% Benzoyl Peroxide. | <1 | 100 | 78—52 |
| | 5 | 100 | 58—56 |
| | 13 | 98 | 61—57 |
| | 19 | 98 | 83—62 |
| | 24 | 40 | 53—40 |
| | 31 | 0 | 8—8 |
| Adhesive made with Tech. MEK, Toluene+3% Benzoyl Peroxide [1]. | <1 | 100 | 77—52 |
| | 5 | 100 | 56—56 |
| | 13 | 100 | 69—59 |
| | 24 | 90 | 60—58 |
| | 34 | 97 | 66—49 |
| | 45 | 90 | 63—57 |
| | 55 | 90 | 60—56 |
| | 69 | 95 | 62—60 |
| Adhesive made with Tech. MEK, Toluene+5% Benzoic Anhydride. | 1 | 99 | 58—56 |
| | 7 | 95 | 56—50 |
| | 14 | 100 | 58—57 |
| | 21 | 98 | 56—54 |
| | 28 | 98 | 56—53 |
| | 35 | 95 | 54—51 |
| | 38 | 100 | 56—56 |

[1] Tests conducted with the addition of 5% benzoyl peroxide confirmed this showing of stabilization effect.

In similar fashion liquid adhesives were prepared containing 5% benzoic acid and 5% benzoquinone. The adhesives were as a result stabilized for greater than 45 days.

While these tables present only a very small fraction of the data collected, and only a few additives, they serve to indicate what can be achieved in the way of reactivating or stabilizing phenol-formaldehyde (resol) liquid adhesives containing hexamethylenetetramine (resol). It should be noted that in table 2 the addition was 5% by weight of the total solids. A slight increase in this percentage often increases the effectiveness of the additive. As an example, an increase of benzoic acid from 5% to 10% by weight of the total solids content resulted in a change in reactivation period of from 22 days to greater than 79 days.

It is also understood that the present invention is not limited to that which is only specifically disclosed in the table and the rest of the specification as many variations will be readily apparent to those skilled in the art and the invention is to be given its broadest possible interpretation within the terms of the following claims:

What we claim is:

1. A method of stabilizing and reactivating a liquid adhesive comprising a phenol-formaldehyde resin of the resol stage and hexamethylenetetramine as a hardening agent, said method comprising the steps of adding a solvent to said adhesive and a compound selected from the group consisting of:
   (1) benzoquinone,
   (2) a peroxide of the type ROOR where R is acyl, alkyl, or aralkyl,
   (3) an anhydride of the type RCOOOCR where R is alkyl or aryl, and
   (4) terephthalic acid; said compound being added in an amount of from 3–15% by weight of the total solids content of the adhesive.

2. The method of claim 1 wherein the compound is benzoquinone.

3. The method of claim 1 wherein the compound is tertiary butyl hydroperoxide.

4. The method of claim 1 wherein the compound is tertiary butyl perbenzoate.

5. The method of claim 1 wherein the compound is methyl ethyl ketone peroxide.

6. The method of claim 1 wherein the compound is cumene hydroperoxide.

7. The method of claim 1 wherein the compound is benzoyl peroxide.

8. The method of claim 1 wherein the compound is benzoic anhydride.

9. The method of claim 1, wherein the compound is acetic anhydride.

10. The method of claim 1 wherein the compound is terephthalic acid.

11. A method of stabilizing and reactivating a liquid adhesive comprising a phenol-formaldehyde resin of the resol stage compounded with a nitrile rubber and hexamethylenetetramine as a hardening agent, said method comprising the steps of adding a solvent to said adhesive and a compound selected from the group consisting of:
   (1) benzoquinone,
   (2) a peroxide of the type ROOR where R is acyl, alkyl, or aralkyl,
   (3) An anhydride of the type RCOOOCR where R is alkyl or aryl, and
   (4) terephthalic acid; said compound being added in an amount of from 3–15% by weight of the total solids content of the adhesive.

12. The method of claim 11 wherein the nitrile rubber comprises a condensation polymer made from butadiene and acrylonitrile.

References Cited by the Examiner

UNITED STATES PATENTS

| 1,720,052 | 7/1929 | Norton | 260—59 |
| 2,124,532 | 7/1938 | Schmitz | 260—59 |
| 2,138,795 | 11/1938 | Schmidt | 260—59 |

MORRIS LIEBMAN, *Primary Examiner.*

A. H. KOECKERT, *Assistant Examiner.*